United States Patent Office 2,889,664
Patented June 9, 1959

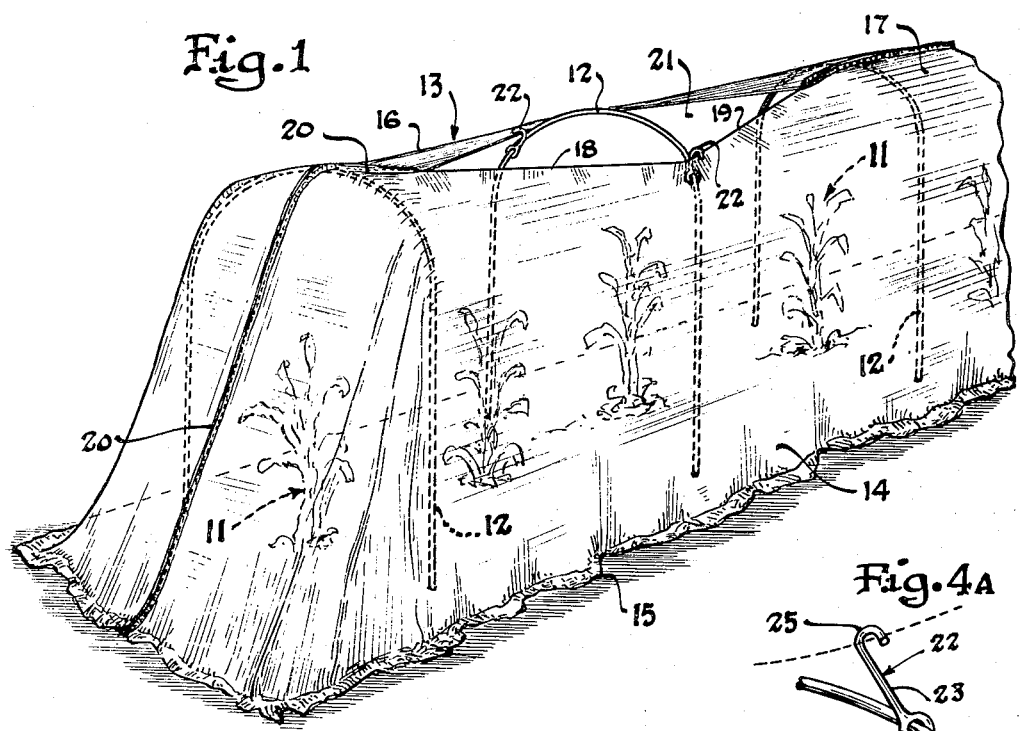
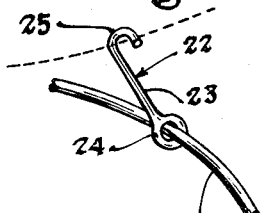
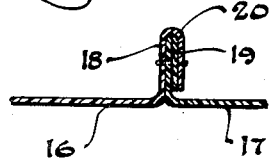
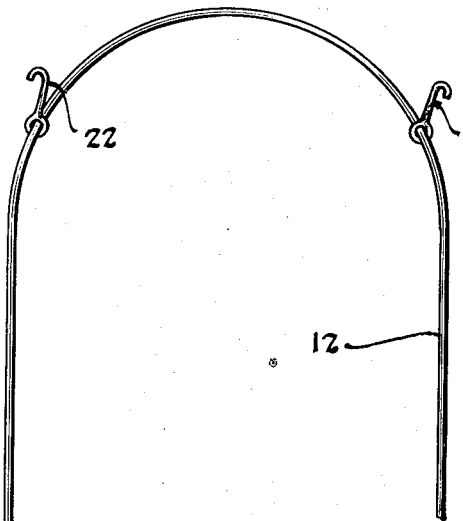
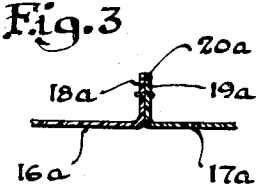
Inventor
Eugene Olshansky
By Mann, Brown and McWilliams
Attorneys

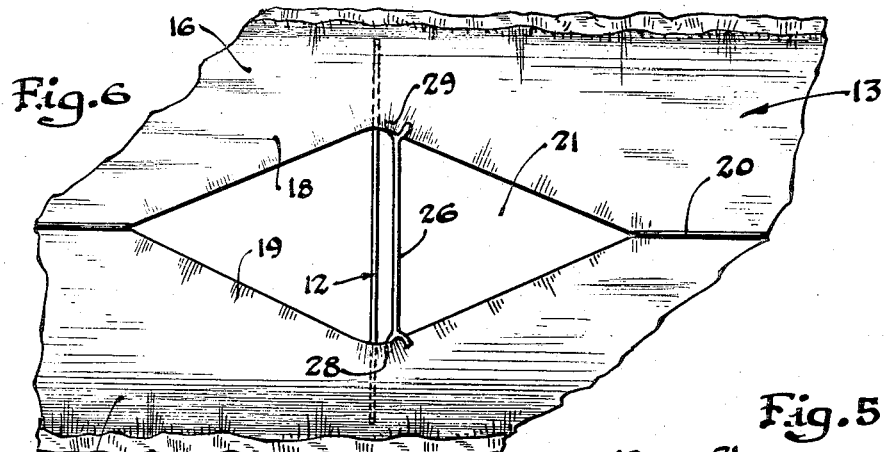
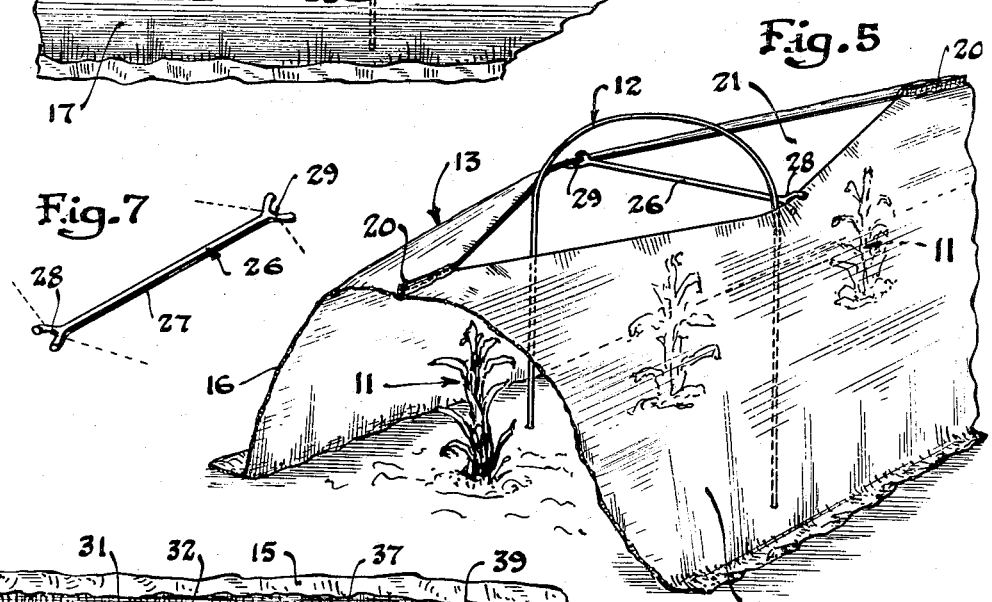
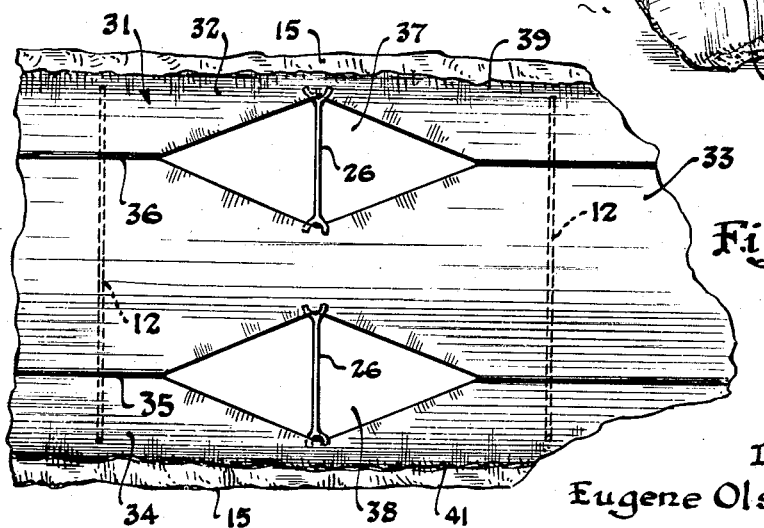

2,889,664

PLANT PROTECTING DEVICE

Eugene Olshansky, Chicago, Ill.

Application April 17, 1956, Serial No. 578,718

1 Claim. (Cl. 47—28)

This invention relates to a device for protecting against damage from frost, winds, and heavy precipitation such as rain or hail, newly-sown seed or plants growing in an open field.

One object of the instant invention is to provide a protective covering which may easily be put over the newly-sown seed-bed or plants at a small expense.

Another object of the present invention is to provide a covering which may be conveniently opened to provide ventilation for the plants or seed-bed.

A further object of the invention herein disclosed is to provide a covering to protect plants or seed against damage from frost, winds, and heavy precipitation such as rain or hail which may easily be opened to provide ventilation for the plants but may also be quickly and easily closed to provide practically an air-tight seal against the outside air.

A further object of the instant invention is to provide a protective covering for plants or newly-sown seed which may be opened to allow cross ventilation through the plants.

Another object of this invention is to provide suitable means for keeping a protective cover for plants open during times when ventilation for the plants is desirable.

Farmers and gardeners have known for many centuries that seeds or plants planted in the open field or garden much earlier than the normal planting time would mature very much earlier than seed or plants planted in the open field or garden at the customary time. Also, these early-planted seeds or plants would have a longer crop-bearing life. However, they have had to contend with the caprice of the weather such as frost or heavy rains or strong winds which would kill or severely damage young plants and also retard germination or subsequent growth of newly-sown seed. With the advent of plentiful glass, greenhouses and hotboxes were built in which the young plants could get an early start and therefore mature earlier. However, the greenhouse and hotbox plants still had to be transplanted and there was still a chance of a late frost which might kill the young plants. Furthermore, the cost of a greenhouse is prohibitive for the small gardener and for many farmers. Therefore, some method of protecting the plants in the field was required which not only protected the plants from a late frost in spring and the damaging effects of heavy rain and strong winds, but could also be used to protect them from an early frost, etc. in autumn and thereby further increase their crop-bearing life. Such a method would also permit the sowing of certain seed in late summer or early autumn and the harvesting of the resulting crops, which normally would be killed by frost, long past the usual bearing and harvesting time, thus extending the growing season considerably. The instant invention is directed to this end by providing a protective covering that may be easily put over a row of plants in the open field.

The means by which the foregoing and other objects are accomplished and the method of their accomplishment will readily be understood from the following specification on reference to the accompanying drawings, in which:

Fig. 1 shows one end of a row of small plants covered by a protective covering open at the top and supported on vertical supports;

Fig. 2 shows a double lap method of joining strips of material to form the cover;

Fig. 3 shows a single lap method of joining strips of material to form a cover;

Fig. 4 shows a support with clamps thereon for holding the cover open;

Fig. 4A shows a detailed view of the clamp shown in Fig. 4;

Fig. 5 shows a portion of one row covered with a second method of holding the cover open;

Fig. 6 is a top view of Fig 5;

Fig. 7 shows in detail a spreader shown in Figs. 5 and 6; and

Fig. 8 is a top view of a portion of a row of plants covered by a cover which allows cross ventilation through the row.

Referring now to Fig. 1 which has been described above, plants 11 such as: tomatoes, roses, gladioli, lettuce, tulips, hyacinths, chrysanthemums, geraniums, cauliflower, peas and beans, are planted in long rows. Supports 12, which may be either square, U-shaped, pointed or any other desired shape are driven into the ground straddling the plants 11. These supports 12 may be made of wire or the like. A cover 13, the specific characteristics of which will be described hereinafter, is placed over the supports 12 so that edges 14 of said cover 13 reach the ground. Earth is then shoveled over the edges 14 as generally indicated by 15 to produce a seal along the outer edges 14 of cover 13. The ends of cover 13 are allowed to fall to the ground where they are covered with dirt in the same manner as edges 14 and thus the complete row is completely encased by enclosure which is practically air-tight. Since it is well known that air is a good insulator, the plants are thus protected from frost which may occur.

The cover 13 is made of either a translucent or transparent flexible plastic material about two mils thick, although other thicknesses may also be used. For reason hereinafter disclosed, the cover 13 is made of two longitudinal strips 16 and 17 of said material. Fig. 2 shows one method of joining the strips in the double lap seam in which longitudinal edges 18 and 19 of strips 16 and 17, respectively, are placed together and then folded over. After the fold is made, the strips may be joined in any one of the convenient manners such as stitching, heat seam welding, or gluing to form seam 20. However, it should be noted that the strips are not joined through the entire length but are joined intermittently. Lengths of approximately 15 inches in every five feet are not joined in the entire length of the cover.

A second method of joining the longitudinal edges of strips is shown in Fig. 3 wherein longitudinal edges 18a and 19a of strips 16a and 17a, respectively, are joined in the single lap method. In the single lap method the edges are simply placed adjacent to each other and one of the convenient methods of joining the plastic material is used to join the edges 18a and 19a to form seam 20a. However, it should be noted that the edges in the single lap method are not joined through the entire length as in the aforementioned double lap joint.

When a row of plants is covered by cover 13, should an unseasonably hot day occur, the plants could literally cook. One alternative would be, of course, to remove the cover during the day and then replace it at night when there is danger of frost. Since the rows are quite long, the expense and trouble of removing the cover and replacing it each evening would be very great indeed. Therefore, it is desirable to provide some simple method of ventilating the plants. As has been described before, the cover 13 is formed by two strips which are intermittently joined. When ventilation for the plants is desired, the non-joined portions are simply spread apart so that openings 21 are made in cover 13 which allow fresh air to cool the plants.

In order to maintain openings 21 in cover 13, hooks 22 are mounted on supports 12 as shown in Figs. 4 and 4A. The hooks or hooking means 22 are attached to the support by an eye portion 24 which has a shank 23 attached thereto and a hook portion 25 on the opposite end of said shank. An inner longitudinal edge at a nonjoined portion of cover 13 fits into the hook portion 25 to hold said edge away from the edge immediately opposite and thereby forms opening 21.

In order to make the enclosure almost air-tight again at the close of the day, the cover must be disengaged from the hooks and the cover 13 simply pulled taut at the opposite ends of the material folds over itself to form practically an air-tight seal. It should be noted that the double lap seam shown in Fig. 2 has been found to be more secure then the single lap seam. However, in case of storms or when high winds are anticipated, a paper clip may be fastened on the seam to hold the seal secure and thereby prevent damage to the cover as well as the plants.

In order to avoid using hooks on the supports, a spreader 26 as shown in Fig. 5 may be used to hold the material of cover 13 apart. Spreader 26 is simply a rod 27 which has a bifurcated end 28 at one end and a bifurcated end 29 at the other end. The longitudinal edge 18 of strip 16 fits into end 29 and the longitudinal edge 19 of strip 17 fits into end 28. In order to close the vent, spreader 26 is simply removed and the seams are drawn tight which results in the cover 13 sealing as described above.

Another method used to form the openings in the cover is to attach a hook to the strip material itself on both sides of a non-joined portion near the center thereof. The longitudinal edges of the non-joined portion are pulled back and placed in said hook to form an opening. When the openings are no longer needed, the material is removed from the hooks and drawn taut as described above to close the openings.

The above described cover may be made by an alternate method from a single strip of plastic material. In this instance, the plastic material is intermittently slit near its central portion. The slits are made in a longitudinal direction so as to replace the non-joined portions described above, and a flap of plastic material slightly longer than said slit is attached in one of the above described manners to one edge thereof in such a manner as to cover the slit. Since the flap is longer than the slit, the flap material may be used to reinforce the material near the slit and thus prevent tearing of the cover at the ends of said slit.

In very cold weather or periods of heavy frost, it has been found that a double layer of cover is more effective in protecting the plants. First one layer of cover material is placed very loosely on supports so that the cover has a great amount of sag. Then a second layer of cover material is placed over the first cover. However, the second cover is drawn taut so that there is an air space between the two layers of cover material. However, it should be noted that in putting the second layer over the first cover, the non-joined seam portions should match so that adequate ventilation may be had when needed. As is well-known, the air is an excellent insulator; however, when there is only one layer of cover material, such as previously described, the convection currents under the cover material tend to reduce the insulating qualities of the air. By the above described arrangement, there is an air space between the layers so that the amount of convection is reduced to provide a greater insulating property.

In some instances a greater degree of ventilation may be required for the plants than that provided by openings 21 on top of rows. Fig. 8 shows a top view of one method in which cross ventilation is provided for a row of plants. Instead of using the two strips to make the cover, the cross ventilation cover 31 is formed by three strips 32, 33 and 34. The strips are joined by any of the methods described above to form seams 35 and 36 between strips 34 and 33 and strips 33 and 32, respectively. However, the strips are joined in such a manner that the intermittent non-joining of strips is such that the non-joined portions on seams 35 and 36 are adjacent to each other for reasons hereinafter disclosed.

The cover 31 is placed on supports 12 in much the same manner as cover 13 and the outer longitudinal edges 39 and 41 are sealed by dirt shown generally by 15. The ends of cover 31 are sealed in the same manner as that used for cover 13. The aforedescribed spreaders 26 are placed in the non-joined portions of cover 31 by the same mode as described above to form vents 37 and 38 in the sides of the cover. Since the vents 37 and 38 are formed across from each other, any wind would blow through the row. It should be noted that vents 37 and 38 may be held open by any of the aforementioned methods and the spreaders are shown only for illustration.

While I have shown and described particular embodiments of my invention, it will occur to those skilled in the art that various changes and modifications may be made without departing from any invention, and I therefore aim in the appended claim to cover all such changes and modifications as fall within the true spirit and scope of my invention.

I claim:

A greenhouse-type plant covering comprising a multitude of supports conveniently spaced in substantially a straight line, a cover made of two translucent strips intermittently joined along their longitudinal edges and resting on and over said supports to provide an elongated enclosure with said joined edges extending along the upper portions of the enclosure, and a pair of hooks on each of alternate supports, said supports positioned so that they are proximate the center of a non-joined length of translucent strips and the hooks adapted to hold apart the aforementioned strips at said length.

References Cited in the file of this patent

UNITED STATES PATENTS

| | | |
|---|---|---|
| 914,708 | Duval | Mar. 9, 1909 |
| 963,099 | Wells | July 5, 1910 |
| 1,904,700 | Starks | Apr. 18, 1933 |
| 2,109,426 | King | Feb. 22, 1938 |
| 2,143,659 | Morrison | Jan. 10, 1939 |

FOREIGN PATENTS

| | | |
|---|---|---|
| 741,029 | Great Britain | Nov. 23, 1955 |